(12) United States Patent
Tewari et al.

(10) Patent No.: US 11,088,843 B2
(45) Date of Patent: Aug. 10, 2021

(54) TRUSTED VIRTUAL PROCESS EXECUTION CONTEXTS USING SECURE DISTRIBUTED LEDGER

(71) Applicant: Nebbiolo Technologies, Inc., Milpitas, CA (US)

(72) Inventors: Ruchir Tewari, Mountain View, CA (US); Sureshkumar Kaliannan, Santa Clara, CA (US); Atul Prasad, Fremont, CA (US)

(73) Assignee: NEBBIOLO TECHNOLOGIES, INC., Milpitas, CA (US)

( * ) Notice: Subject to any disclaimer, the term of this patent is extended or adjusted under 35 U.S.C. 154(b) by 363 days.

(21) Appl. No.: 16/270,482

(22) Filed: Feb. 7, 2019

(65) Prior Publication Data
US 2020/0259660 A1    Aug. 13, 2020

(51) Int. Cl.
*H04L 9/32* (2006.01)

(52) U.S. Cl.
CPC .......... *H04L 9/3236* (2013.01); *H04L 9/3242* (2013.01); *H04L 2209/38* (2013.01)

(58) Field of Classification Search
CPC . H04L 9/3236; H04L 9/3242; H04L 2209/38; H04L 63/126; H04L 9/3239
See application file for complete search history.

(56) References Cited

U.S. PATENT DOCUMENTS

| | | | |
|---|---|---|---|
| 2019/0319964 A1* | 10/2019 | Smith | ...................... H04L 69/22 |
| 2020/0136808 A1* | 4/2020 | Chasko | ................. H04L 9/3239 |
| 2020/0213305 A1* | 7/2020 | Obaidi | ................ H04L 63/0876 |

* cited by examiner

*Primary Examiner* — Matthew Smithers
*Assistant Examiner* — Mirza Israr Javed
(74) *Attorney, Agent, or Firm* — Barry Choobin; Patent 360LLC

(57) ABSTRACT

Trusted virtual process execution contexts using secure distributed ledger are disclosed herein. An example system can be configured to determine an allowable state for an IoT endpoint node of the IoT endpoint nodes, the allowable state having one or more trusted parameters for the IoT endpoint node; hashing the one or more trusted parameters of the allowable state for the IoT endpoint node into a parameter hash; store the hashed, trusted parameters along with the parameter hash; hashed, trusted and provision the one or more trusted elements with the one or more trusted parameters for the IoT endpoint node when the one or more trusted parameters are verified.

20 Claims, 6 Drawing Sheets

TRUSTED VIRTUAL PROCESS EXECUTION CONTEXTS USING SECURE DISTRIBUTED LEDGER

CROSS REFERENCE TO RELATED APPLICATIONS

This application is related to U.S. Non-Provisional patent application Ser. No. 15/468,004 filed on Mar. 23, 2017 and titled "Fog Computing Facilitated Flexible Factory," which claims the benefit and priority of U.S. Provisional Application Ser. No. 62/313,640, filed on Mar. 25, 2016, titled "Fog Computing Facilitated Flexible Factory" which is hereby incorporated by reference in their entireties, including all references and appendices cited therein. This application is also related to U.S. Non-Provisional patent application Ser. No. 15/785,290 filed on Oct. 16, 2017 and titled "Enterprise Grade Security for Integrating Multiple Domains with a Public Cloud," which claims the benefit and priority of U.S. Provisional Application Ser. No. 62/411,422, filed on Oct. 21, 2016, titled "Enterprise Grade Security Enablement for IT/OT Device Integration Into Public Cloud," which is hereby incorporated by reference in their entireties, including all references and appendices cited therein.

FIELD OF THE INVENTION

The present technology pertains generally to network security and in specific embodiments to trusted execution of processes in virtual contexts. In some embodiments, a trust management service or agent is deployed within a network to secure various elements and restrict their associated configurations and capabilities. Some embodiments involve provisioning trusted elements and configurations for Internet-of-Things (IoT) endpoint nodes.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system comprising Internet-of-Things (IoT) endpoint nodes; and a trust management service configured to determine an allowable state for an IoT endpoint node of the IoT endpoint nodes, the allowable state comprising one or more trusted elements and trusted configurations for the IoT endpoint node; hash the one or more trusted elements of the allowable state for the IoT endpoint node into an element hash; hash the trusted configurations of the allowable state for the IoT endpoint node into a configuration hash; store the hashed, trusted elements along with the element hash; store the hashed, trusted configurations along with the configuration hash; and provision the one or more trusted elements with the trusted configurations for the IoT endpoint node.

Another general aspect includes a system comprising a distributed database storing a blockchain ledger; and a trust management service configured to: determine trusted elements and trusted configurations of Internet-of-Things (IoT) endpoint nodes; hash the trusted elements into an element hash; hash the trusted configurations into a configuration hash; store the element hash and the configuration hash in the blockchain ledger and provision the trusted elements for an IoT endpoint node of the Internet-of-Things (IoT) endpoint nodes with the trusted configurations using the element hash and the configuration hash of the blockchain ledger.

According to some embodiments, the present disclosure is directed to an example method comprising: hashing one or more trusted parameters for IoT endpoint nodes into a parameter hash; storing the hashed trusted parameters, trusted for the IoT endpoint nodes in a blockchain ledger; receiving a request to provision an IoT endpoint node of the IoT endpoint nodes; and provisioning the IoT endpoint node with the trusted parameters when the one or more trusted parameters are verified using the parameter hash.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, the present disclosure is directed to systems and methods that provide security for devices or nodes executing within a network, such as a Fog® network. The network can be configured to service endpoint nodes. For example, a Fog® network can orchestrate a plurality of IoT endpoint nodes in an industrial environment, such as a manufacturing facility or a farm.

Figure 1:
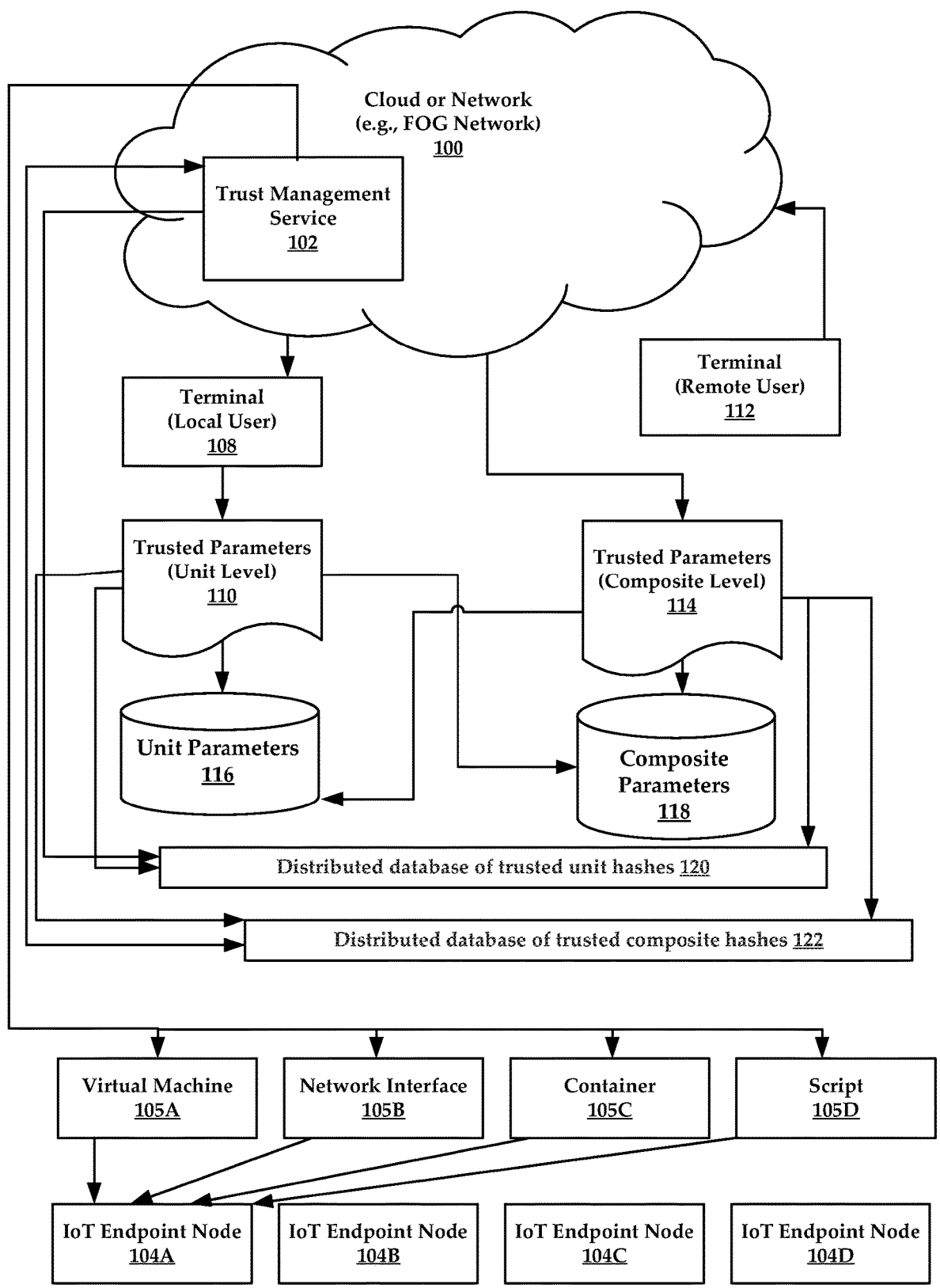
FIG. 1 is a schematic diagram of an example system constructed in accordance with the present disclosure.

FIG. 1 is a schematic representation of an example environment where aspects of the present disclosure are practiced. The environment generally comprises a network 100 that could include a Fog® network. The network 100 can encompass a trusted virtual private Fog® network.

In general, the network 100 or system can include a trust management service 102 and a plurality of IoT endpoint nodes 104A-104C. While IoT endpoint nodes 104A-104C are illustrated, fewer or more nodes that these can be utilized. The trust management service 102 can functionally exist on one or more Fog® nodes in a Fog® network and the IoT endpoint nodes 104A-104C. In general, the trust management service 102 can exist in any network and is located between a management or orchestration layer or component of the network and the endpoint nodes of the network such as end user devices, sensors, or IoT devices. In general, the trust management service 102 can execute on a physical or virtual server, within a container, or otherwise in a cloud environment—just as examples.

The trust management service 102 can be configured ensure that parameters of the IoT endpoint nodes 104A-104C are trusted so as to prevent malicious or otherwise deleterious behavior of the IoT endpoint nodes 104A-104C. In general, the trusted parameters can comprise any configurations of networks, applications and scripts, in unit and/or composite forms. The trusted parameters are utilized to provision IoT endpoint nodes, and more specifically to configure the IoT endpoint node inputs for one or more IoT endpoint nodes.

In some embodiments, the parameters comprise one or more elements and configurations of those elements for the IoT endpoint nodes 104A-104C. These parameters are trusted so as to prevent malicious or otherwise deleterious behavior of the IoT endpoint nodes 104A-104C.

An example element can include metadata for Virtual Machines, containers and application binaries such as a unique identifier, version and signature. In some embodiments, the trusted parameters are a representation of the configuration of each of a plurality of diverse building blocks of an application (e.g., IoT endpoint node inputs)—including network, application, scripts, and the like. The trusted parameters are used to provision IoT endpoint node inputs, such as IoT endpoint nodes 105A-105D, which are described in greater detail infra.

In one example use case, an IoT device such as a welding robot on a manufacturing floor may require the provisioning of various elements and configurations to function. In one example, the welding robot can be controlled using a process running on a virtual machine and with associated configurations and settings. These elements are selected by an operator who programs through a terminal 108 (Local User). The terminal 108 can include a local terminal near or in the same location as the manufacturing floor where the programmer provides trusted parameters 110 at the edge of the network 100 close to the IoT endpoint nodes 104A-104C. These parameters can also, in some embodiments, include unit level parameters, which are more granular level data.

In another example, another terminal 112 (Remote User) can be used to program the welding robot by providing trusted parameters 114 near the cloud level. These parameters can also, in some embodiments, include composite level parameters, which are larger or aggregate data compared to the unit level data.

Generally, the trust management service 102 can ensure that parameters selected and executed for an IoT endpoint node are trusted. In some embodiments, the trust management service 102 operates in a learning mode, where the trust management service 102 evaluates parameters created by the programmers and identifies them as being trusted. In this phase or mode, iterative changes to the parameters for the elements of an IoT endpoint node can be accepted and integrated into what are considered to be trusted parameters. This behavior is referred to generally as rolling replacement where new parameters are utilized as they are identified by the trust management service 102.

When the network 100 comprises a fog context the learning phase receives inputs from configuration steps of a network and application to the Fog that are performed by the trusted Fog middleware. However it is possible for the learning to occur through inputs obtained through a network proxy or a passive listening device as well, and be stored in a secure ledger by the nodes for a process running on a different hardware on the same network.

In some embodiments, the trusted parameters are used to configure a plurality of IoT endpoint node inputs a virtual machine 105A, a network interface 105B, a container 105C, or a script 105D (e.g., application). Other IoT endpoint node inputs are likewise contemplated. In general an IoT endpoint node inputs is an object that can be configured with trusted parameters. Thus, trusted parameters are described herein can include any value or attribute used to define how an IoT endpoint node inputs or object operates.

Other example IoT endpoint node inputs include modbus and OPC/UA (unified architecture) programs and configuration data in Json/XML or text formats. Time Sensitive Network schedules that are distributed to different fogNodes are also considered example IoT endpoint node inputs.

In one embodiment, the IoT endpoint node 104A utilizes each of the IoT endpoint node inputs 105A-105D. Other IoT endpoint nodes can use fewer or less of the IoT endpoint node inputs 105A-105D than those used by IoT endpoint node 104A.

In some embodiments, the trust management service 102 can transition from a learning mode to a lockdown mode or phase where no additional changes to the trusted parameters for IoT endpoint node inputs for IoT endpoint node(s) are allowed.

According to some embodiments, the trust management service 102 is configured to use hashing and verification process to ensure that only trusted parameters are provisioned to an IoT endpoint node (and specifically its IoT endpoint node inputs).

In more detail, the trust management service 102 can hash any of the trusted parameters for IoT endpoint node inputs and store the same in the blockchain ledger. For example, a hash value for trusted elements can be created. The hash value is an immutable representation of the trusted parameters that can be subsequently used in a verification process. In some embodiments, the trusted parameters can be hashed at a granular level, such as individual configurations like an Internet Protocol (IP) address. In other embodiments, a plurality of related trusted parameters can be hashed together. For example, an IP address and a media access control (MAC) address can be hashed into a single value. According to some embodiments, the trusted parameters can be stored in a distributed architecture such as a blockchain ledger.

In various embodiments, hashes can be created at a unit or composite level. At a unit level, hashes could be calculated over a configuration item (IoT endpoint node input) and container/VM item of the IoT endpoint node inputs 105A-105D shown in the FIG. 1 (e.g., networking, VMs, Containers, Scripts, Host configuration files). Each IoT endpoint node input includes metadata about a target element and a unique name that changes with contents of the IoT endpoint node input (such as a container name), or a hash of the contents (such as a SHA256 hash of a VM image) which changes with the input contents.

In contrast, composite hashes are defined as a function over the elemental hashes. The function relating the elemental hash and a composite hash is typically a tuple (e.g., line by line listing of the hashes and metadata). It could also comprise a Merkle Tree (for large element data) or a rolling hash (for fast moving element data) or some other function based on type of data and the rate of change that is represented by the elemental hash. Both elemental hashes and composite hashes are stored on the blockchain ledger or two separate ledgers—they can be separately identified by each node.

Both elemental hashes and composite hashes can be stored on the blockchain ledger or two separate ledgers—they can be separately identified by each node (e.g., IoT endpoint node). Advantageously, a running state of a process, including all its inputs, can be captured in a composite hash to catch the good signature/allowable state during the learning phase.

In one example, a good state includes: E1good(i), E2good(i), E3good(i), E4good(i)-->CompositeHashgood(i) where the ith Composite Good state is composed from a set of N possible good states due to elemental process input types E1, E2, E3, E4. Conversely, a bad state includes: E1bad(i), E2good(i), E3good(i), E4good(i)-->CompositeHashbad(j), where a bad state is reflected in bad compositeHash which can be root caused to E1 configuration.

Because the target IoT processes have a limited range of operation, the number of such hashes can be managed and stored on the device itself, in some embodiments.

The present disclosure enables the following advantages during a malware attack that targets device configuration, or a misconfiguration. In some instances, the systems and methods of the present disclosure allow bad state to be detected as a change in a composite hash, to one outside the good set. In another embodiment, when the cause of a bad state is root caused it can be traced to a specific bad input element (such as due to misconfiguration or malware), by determining which elemental hash of a composite hash changed.

In another embodiment, a good state can be recovered quickly without human intervention by changing the configuration to that corresponding to a good elemental hash and corresponding good composite hash.

Further advantages can be attributed to the use of blockchain ledger data storage. Because the ledger used is a distributed blockchain, the trust mechanism will resist attacks even though it is disconnected from a server database or connected to a malicious server. This is important because malware targeting IoT devices has redirected IoT node traffic to malicious servers. The ledger based trust mechanism is useful also because IoT deployments are hard to update unlike data center deployments. Competing approaches depending on good connectivity to a server database would fail. In some embodiments, all key IoT device node inputs and their parameters are captured; this provides a virtual process execution context that can be replayed on a different hardware that has access to the ledger. The systems and methods of the present disclosure also build resistance to zero-day attacks which are difficult to address using authentication and white-listing schemes.

In various embodiments, the trust management service 102 is configured to verify that parameters for an IoT endpoint node are trusted. In certain embodiments, the trust management service 102 can evaluate current parameters provisioned for an IoT endpoint and verify if these current parameters/configurations correspond to the trusted parameters that are stored for the IoT endpoint (and specifically the IoT endpoint node inputs).

In more detail, a programmer or other user can utilize either the terminal 108 or the terminal 112 to define parameters for IoT endpoint node inputs of individual IoT endpoint nodes. When the trust management service 102 is in learning mode and the programmer completes the setup process for the IoT endpoint node inputs one or more IoT endpoint nodes, the trust management service 102 can store the parameters for the IoT endpoint node in a database. In some instances, the parameters of the IoT endpoint node can be stored in a database of unit parameters 116. Thus, in this database, individual granular parameters are stored.

Composite parameters can also be stored in a database of composite parameters 118. The composite parameters are combinations of individual unit parameters in some embodiments.

In some embodiments, the database of unit parameters 116 and the database of composite parameters 118 can be combined into a single database. These parameters received from a programmer are generally referred to as trusted parameters. The one or more trusted parameters for the IoT endpoint node inputs are collectively referred to as an allowable state for an IoT endpoint node.

Once the IoT endpoint node inputs and their respective parameters have been defined and identified by the trust management service 102, the trust management service 102 is configured to hash both the trusted parameters. That is, in some embodiments, the trust management service 102 stores the trusted parameters/attributes of the IoT endpoint node inputs. In one or more embodiments, the trust management service 102 applies a hashing function to generate a hash of the parameters. Again, this can be performed on a unit or composite level.

A unit level parameter hash can be stored in a distributed database of trusted unit hashes 120. In one embodiment, the distributed database of trusted composite hashes 120 comprises a public blockchain ledger.

According to some embodiments, the hashing function utilized by the trust management service 102 can include any suitable hashing function such as, SHA-2 or SHA-3—to name a few. In some embodiments hashes are secure hashes created using a 'keyed hashing scheme' with a shared secret key that is available to the IoT endpoint nodes that may be rooted in a hardware root of trust, such as a TPM (trusted platform module). In some embodiments, the system 100 of FIG. 1 is constructed as a distributed fog-wide TPM for trusted execution, instead of a local node-specific TPM.

In various embodiments, the trust management service 102 can continually or periodically update the parameters for the IoT endpoint node inputs as an operator or programmer updates the same. These newer or updated versions of the trusted parameters can also be hashed and stored.

Figure 2:
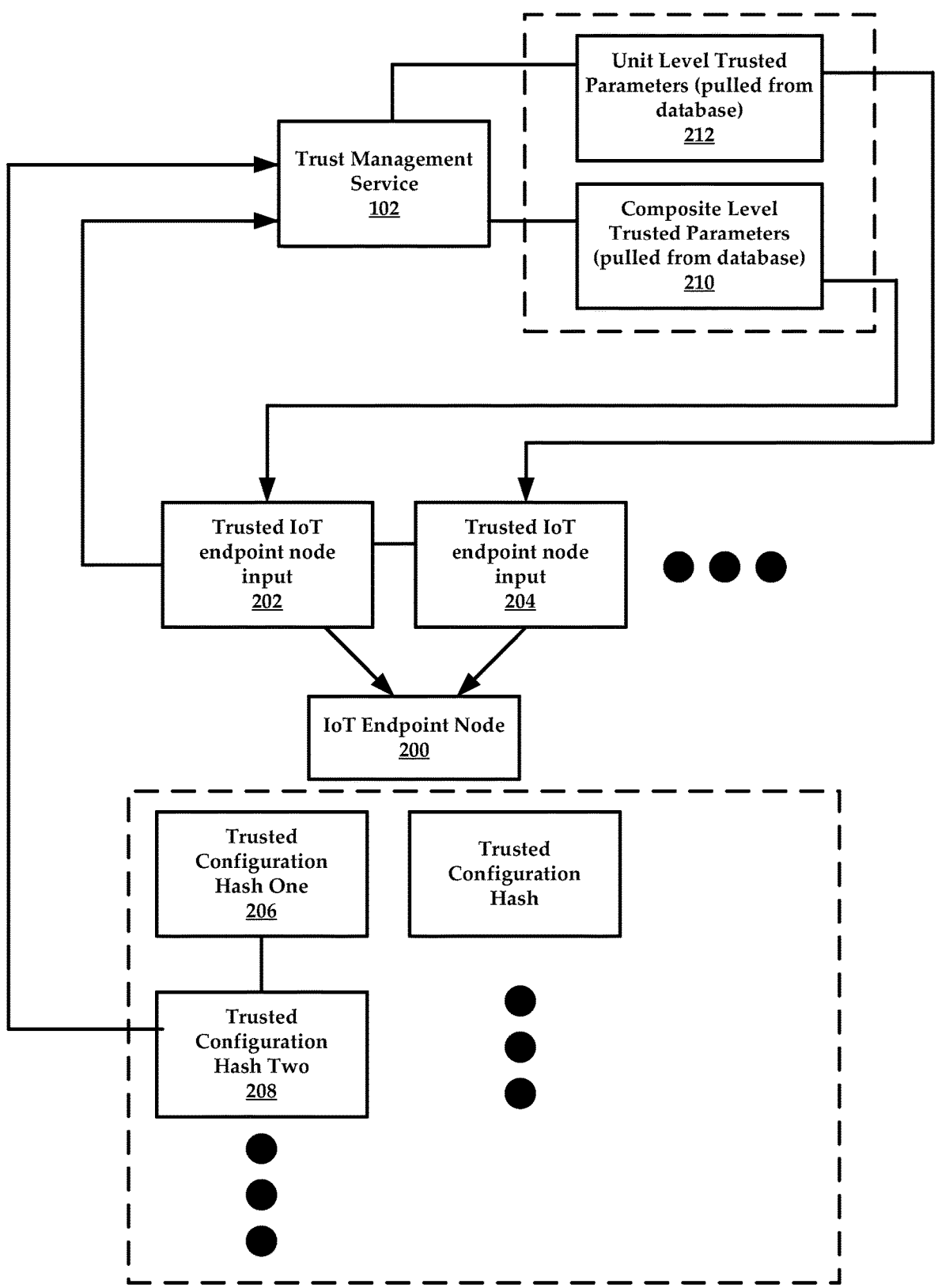
FIG. 2 illustrates an example distributed structure for elements and configurations thereof.

According to some embodiments, the various iterative versions of the hashes (could be unit or composite) generated by the trust management service 102 can be stored in a linear or hierarchical arrangement or in a distributed hash tree. FIG. 2 illustrates an example hash tree for an IoT endpoint node. In some embodiments, the IoT endpoint node 200 has two IoT endpoint node inputs 202 and 204 related to a virtual machine and a program, respectively. Each of the IoT endpoint node inputs 202 and 204 is associated with trusted configurations that have changed over time. For example, IoT endpoint node input 202 has trusted configurations represented as hash one 206 and hash two 208, where trusted configurations associated with hash one 206 were created at a first point in time and trusted configurations associated with hash two 208 were created at a second point in time that was subsequent to the first point in time. The hash two 208 is thus positioned under hash one 206 in the tree.

The ability to store multiple hashes of trusted configurations allows for the trust management service 102 (also see FIG. 1) to provision the IoT endpoint node 200 with composite level trusted parameters 210 associated with hash two 208. If these trusted configurations are somehow unavailable due to database unavailability or because the configurations are corrupt, the trust management service 102 can utilize the trusted configurations associated with hash one 206. This same process can be performed for trusted elements as well. To be sure, unit level trusted parameters 212 can also be pulled from a database and used as well.

Also, the storage of hash values of iterative versions of configurations (composite) allows for identification of changes between different sets of trusted parameters. In one example, a second set of trusted parameters for an IoT endpoint node can be created, but when hashed the trust management service 102 compares the newest hash with the most recently stored hash and determines that they are identical. Because they are identical there is no need to store the trusted parameters of this second set. Without this hash-driven comparison of data, the trust management service 102 would store a redundant set of trusted parameters which wastes storage resources, thus providing a clear technical advantage.

As noted above, the various parts or parameters of a set of trusted parameters can be hashed together to generate a composite hash value. In other instances, the parts or parameters of a set of trusted parameters can be hashed individually. According to some embodiments, the trusted parameters and hashes of these data are associated with an identifier for the IoT endpoint node to which they belong. In one example, the data are associated with a device name or unique identifier for the IoT endpoint node. In another embodiment, rather than referring to a unique endpoint the data can be linked to an IoT endpoint node type. For example, all air quality sensors in a building are provisioned with the same trusted parameters (for use with the same provisioned IoT endpoint node inputs).

In some embodiments, when a request is received by the trust management service 102 to provision an IoT endpoint node. This request can be received from an entity such as a Fog® node, or from any other entity in the network that is configured to control the IoT endpoint node. In some embodiments, the request could be received from an edge device that controls the IoT endpoint node.

Upon receiving the request, the trust management service 102 is configured to provision the IoT endpoint node with trusted parameters. In more detail, the trust management service 102 can obtain the trusted parameters from the blockchain ledger or database. In order to verify the trusted parameters which were obtained, the trust management service 102 can hash the trusted parameters into a parameter verification hash. The trust management service 102 verifies the trusted parameters by comparing the parameter verification hash to the parameter hash that was previously stored in the blockchain ledger. If these comparisons result in matches, the trusted parameters are deemed to be verified and the IoT endpoint node can be configured accordingly. If verification fails, the trust management service 102 can terminate the setup of the IoT endpoint node. In another embodiment, the trust management service 102 can provision but identify the IoT endpoint node for review.

Figure 3:
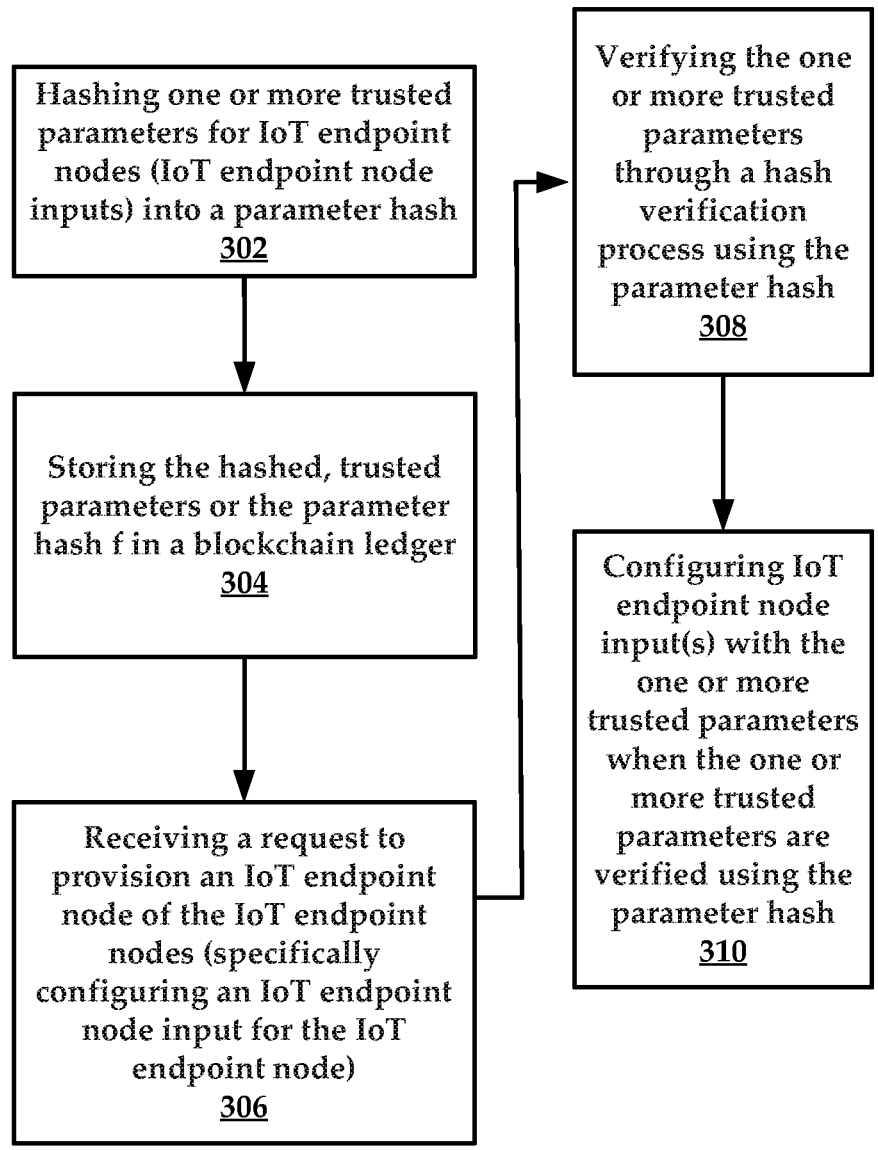
FIG. 3 is a flowchart of an example method of the present disclosure.

FIG. 3 is a flowchart of an example method of the present disclosure. The method generally includes learning the parameters established for IoT endpoint node inputs for one or more IoT endpoint nodes as defined by an IoT endpoint node programmer or user. The parameters learned are referred to as trusted parameters.

The method can include a step 302 of hashing one or more trusted parameters for IoT endpoint nodes into a parameter hash. For example, this could include identifying a virtual machine and/or program set for the virtual machine.

Other parameters/configurations include individual configurable aspects for the IoT endpoint node inputs. For example, the configurations for the virtual machine element (one type of IoT endpoint node input) could include CPU core numbers, memory allocation, disk space allocation, and operating system—just to name a few.

The method then includes a step 304 of storing the hashed, trusted parameters for the IoT endpoint nodes in a blockchain ledger. The hashed, trusted parameters can also be stored in any other distributed or non-distributed database in other embodiments. To be sure, this hashing and/or storage can be performed at the unit or composite level as noted above.

Next, the method includes a step 306 of receiving a request to provision an IoT endpoint node of the IoT endpoint nodes. More specifically, this can include provisioning one or more IoT endpoint node inputs for an IoT endpoint node. For example, an IoT endpoint node could have a plurality of IoT endpoint node inputs such as VMs, containers, scripts, and so forth. Each of these IoT endpoint node inputs is preferably provisioned with trusted parameters.

This request to provision the IoT endpoint node could come from a Fog node in a Fog network or from any other network component or entity. The request to provision could include a request to activate an IoT endpoint node to operation. In an example, an autonomous delivery vehicle can be activated and operated to run a script according to a particular navigation pattern.

The method can include a step 308 of verifying one or more trusted parameters through a hash verification process. An example hash verification process is illustrated and described with respect to FIG. 4.

The method also includes a step 310 of configuring IoT endpoint node inputs with the trusted parameters for the IoT endpoint node when the one or more trusted parameters are verified.

Figure 4:
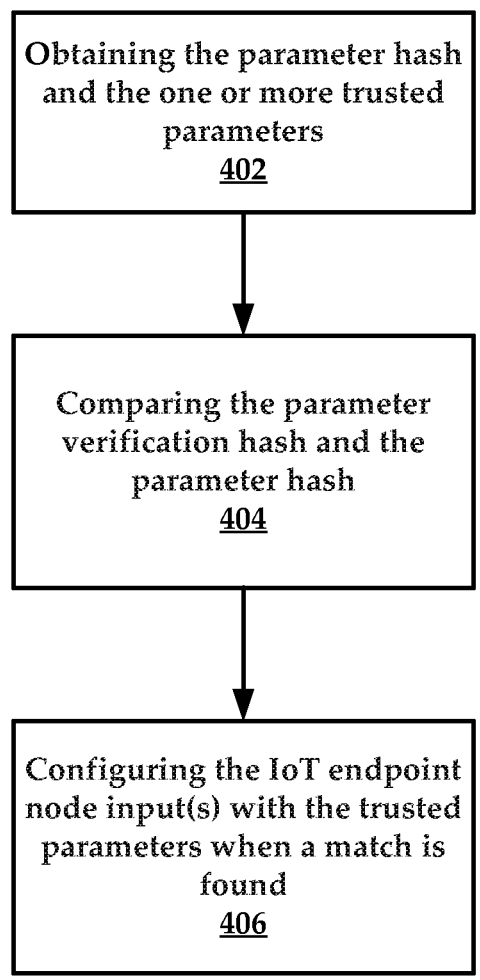
FIG. 4 is a flowchart of another example method of the present disclosure.

In FIG. 4, an example hash verification process is illustrated. The method includes a process for first verifying the one or more trusted elements for the IoT endpoint node. This process can include a step 402 of obtaining the parameter hash and the one or more trusted parameters. The method then includes hashing the one or more trusted parameter into a parameter verification hash. Thus, the hash of the one or more trusted parameter occurs a second time, subsequent to the hashing process used to initially generate the parameter hash that was stored in the blockchain ledger.

The method then includes a step 404 of comparing the parameter verification hash and the parameter hash. When the parameter verification hash and the parameter hash match the IoT endpoint node (specifically the IoT endpoint node input(s)) is provisioned with the one or more trusted parameter. For example, if verified the trusted parameter such as a virtual machine, container, or script can be spun up for use.

When a match is determined the method includes a step 410 of configuring the IoT endpoint node input(s) with the trusted parameters when a match is found. These process of FIGS. 3 and 4 can be performed when an IoT endpoint node is first instantiated, at regular intervals, or periodically when any of the trusted elements or trusted configurations change. In another example, the verification process can occur whenever the IoT endpoint node cycles on or off.

Figure 5:
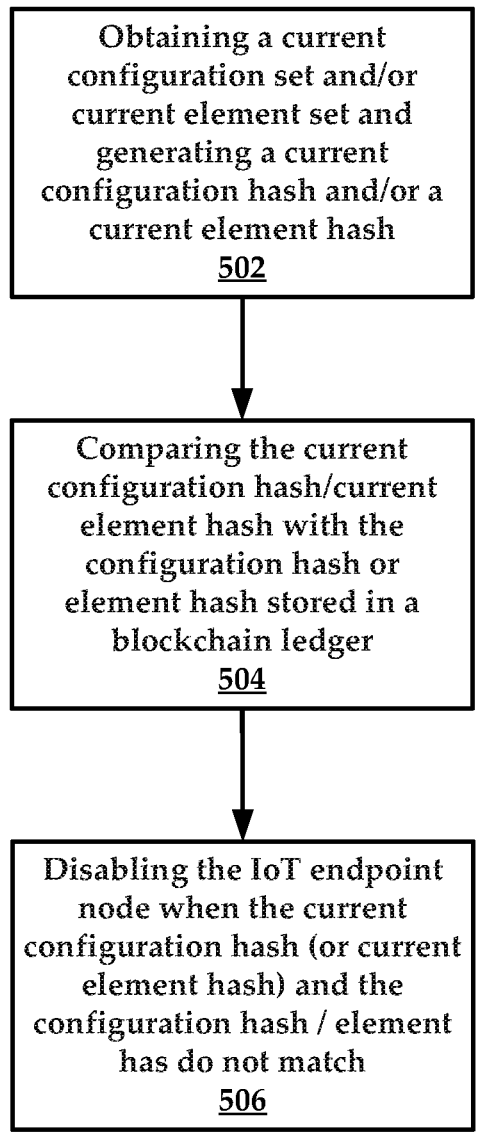
FIG. 5 is a flowchart of an example method for verifying a current element and/or configuration set for an IoT endpoint node.

FIG. 5 is a flowchart another example method of the present disclosure. The method differs from that of FIGS. 3 and 4 inasmuch as the method contemplates the verification of elements and/or configurations currently provisioned to an IoT endpoint node. That is, this method can be used to determine if a current element/configuration for an IoT endpoint node have been tampered with.

Thus in some embodiments, the method includes as step 502 of obtaining a current configuration set and/or current element set and generating a current configuration hash and/or a current element hash. Next, the method includes a step 504 of comparing the current configuration hash/current element hash with the configuration hash or element hash stored in a blockchain ledger. Based on this comparison, the method can include a step 506 of disabling the IoT endpoint node when the current configuration hash (or current element hash) and the configuration hash/element has do not match. This lack of matching is indicative of a lack of parity between the hashes of known allowable states stored in the blockchain ledger and what is currently provisioned on the IoT endpoint node. This discrepancy can be indicative of a condition such as presence of malware or presence of corrupted data.

Figure 6:
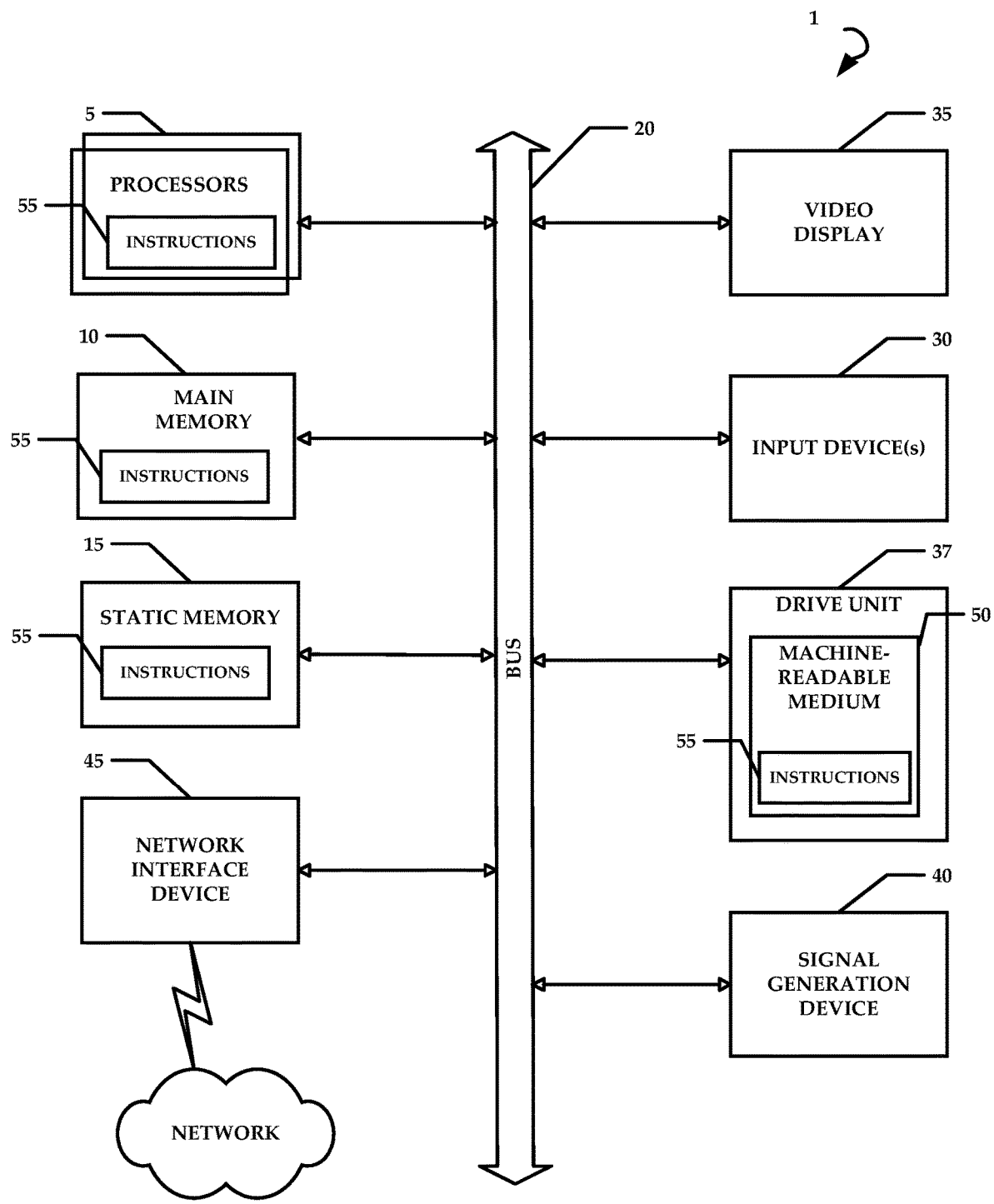
FIG. 6 is a diagrammatic representation of an example machine in the form of a computer system.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data hashing module (not shown) to hash data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system, comprising:
   Internet-of-Things (IoT) endpoint nodes; and
   a trust management service configured to:
      determine an allowable state for an IoT endpoint node of the IoT endpoint nodes, the allowable state comprising one or more trusted parameters for the IoT endpoint node;
      hash the one or more trusted parameters of the allowable state for the IoT endpoint node into a parameter hash;
      store the hashed, trusted parameters along with the parameter hash; and
      provision the IoT endpoint node with the one or more trusted parameters after verification of the one or more trusted parameters using the hashed, trusted parameters.

2. The system according to claim 1, wherein the trust management service is configured to provision the IoT endpoint node by:
   receiving a request to provision the IoT endpoint node;
   obtaining the parameter hash and the one or more trusted parameters;
   hashing the one or more trusted parameters into a parameter verification hash; and
   comparing the parameter verification hash and the parameter hash, wherein when the parameter verification hash and the parameter hash match the IoT endpoint node is provisioned with the one or more trusted parameter.

3. The system according to claim 2, wherein the trusted parameters are hashed at a unit level or a composite level.

4. The system according to claim 3, wherein the trust management service is further configured to update the one or more trusted parameters as new trusted parameters are identified for the IoT endpoint node, wherein hashes of the new trusted parameters are stored at the composite level.

5. The system according to claim 4, wherein the trust management service is further configured to switch between a learning phase where the new trusted parameters are identified, and a lockdown phase where the one or more trusted parameters cannot be updated.

6. The system according to claim 1, further comprising a first distributed database for storing the hashed, trusted parameters along with the parameter hash at a unit level.

7. The system according to claim 6, further comprising a second distributed database for storing the hashed, trusted parameters along with the parameter hash at a composite level.

8. The system according to claim 7, wherein the unit level or composite level hashes are stored in the blockchain ledger.

9. A system, comprising:
   a distributed database storing a blockchain ledger;
   a trust management service configured to:
      determine one or more trusted parameters for IoT endpoint node inputs of Internet-of-Things (IoT) endpoint nodes;
      hash one or more the trusted parameters into a parameter hash;
      store the parameter hash in the blockchain ledger; and
      provision the one or more trusted parameters for an IoT endpoint node inputs using the parameter hash of the blockchain ledger.

10. The system according to claim 9, wherein the IoT endpoint node input comprise any of a virtual machine, a network, a controller, or a container.

11. A method, comprising:
   hashing one or more trusted parameters for IoT endpoint nodes into a parameter hash;
   storing the hashed, trusted parameters hashed, trusted for the IoT endpoint nodes in a blockchain ledger;
   receiving a request to provision an IoT endpoint node of the IoT endpoint nodes; and
   provisioning the IoT endpoint node with the trusted parameters when the one or more trusted parameters are verified using the parameter hash.

12. The method according to claim 11, further comprising:
   obtaining the one or more trusted parameters;

generating another parameter hash from the trusted parameters;

comparing the another parameter hash to the parameter hash; and configuring the IoT endpoint node with the one or more trusted parameters when a match is found.

13. The method according to claim 11, further comprising determining an allowable state for an IoT endpoint node, the allowable state comprising the one or more trusted parameters, the trusted parameters comprising one or more trusted elements or one or more trusted configurations for the IoT endpoint node.

14. The method according to claim 13, further comprising storing the one or more trusted elements along with the element hash in the blockchain ledger.

15. The method according to claim 14, further comprising storing the trusted configurations along with the configuration hash in the blockchain ledger.

16. The method according to claim 11, further comprising:

hashing a current configuration set of the IoT endpoint node into a current configuration hash;

comparing the current configuration hash with the configuration hash; and disabling the IoT endpoint node when the current configuration hash and the configuration hash do not match so as to detect malicious behavior.

17. The method according to claim 11, further comprising updating and replacing the one or more trusted parameters as new trusted parameters are identified.

18. The method according to claim 11, further comprising storing the new trusted parameters with the new trusted parameters in the blockchain ledger.

19. The method according to claim 11, further comprising activating a lockdown phase that prevents changes to any of the trusted parameters.

20. The method according to claim 11, wherein the parameter hash is a secure hash generated using a keyed hashing scheme using a shared secret key available to the IoT endpoint nodes, wherein at least a portion of the IoT endoint nodes are rooted in a hardware root of trust.

* * * * *